United States Patent
Hyodo et al.

(10) Patent No.: US 10,101,602 B2
(45) Date of Patent: Oct. 16, 2018

(54) IMAGE DISPLAY DEVICE

(71) Applicant: Japan Display Inc., Tokyo (JP)

(72) Inventors: Yosuke Hyodo, Tokyo (JP); Shinichiro Oka, Tokyo (JP)

(73) Assignee: Japan Display Inc., Tokyo (JP)

( * ) Notice: Subject to any disclaimer, the term of this patent is extended or adjusted under 35 U.S.C. 154(b) by 20 days.

(21) Appl. No.: 15/429,246

(22) Filed: Feb. 10, 2017

(65) Prior Publication Data

US 2017/0269439 A1 Sep. 21, 2017

(30) Foreign Application Priority Data

Mar. 17, 2016 (JP) ................................. 2016/053988

(51) Int. Cl.
| | |
|---|---|
| G02F 1/1333 | (2006.01) |
| G02F 1/1343 | (2006.01) |
| G02F 1/1368 | (2006.01) |
| G02F 1/1362 | (2006.01) |
| G02F 1/1335 | (2006.01) |
| G02F 1/1337 | (2006.01) |

(52) U.S. Cl.
CPC ...... *G02F 1/133305* (2013.01); *G02F 1/1337* (2013.01); *G02F 1/1368* (2013.01); *G02F 1/133514* (2013.01); *G02F 1/134309* (2013.01); *G02F 1/136227* (2013.01); *G02F 2201/123* (2013.01); *G02F 2201/40* (2013.01); *G02F 2202/022* (2013.01)

(58) Field of Classification Search
CPC ............. G02F 1/134309; G02F 1/1368; G02F 1/136227; G02F 1/133514; G02F 1/1337; G02F 1/133305
See application file for complete search history.

(56) References Cited

U.S. PATENT DOCUMENTS

| | | | | |
|---|---|---|---|---|
| 5,734,456 | A * | 3/1998 | Takao ..................... | G02B 5/201 349/106 |
| 8,724,058 | B2 * | 5/2014 | Tsao ...................... | G02B 5/201 345/88 |
| 9,110,329 | B2 * | 8/2015 | Miyazaki .......... | G02F 1/133536 |
| 2012/0088040 | A1 | 4/2012 | Matsumori et al. | |
| 2014/0232962 | A1 * | 8/2014 | Ishida ................... | H01L 25/167 349/42 |

(Continued)

FOREIGN PATENT DOCUMENTS

| | | |
|---|---|---|
| JP | H11-024055 A | 1/1999 |
| JP | 2000-122039 A | 4/2000 |
| JP | 2003-195288 A | 7/2003 |

(Continued)

*Primary Examiner* — Dung Nguyen
(74) *Attorney, Agent, or Firm* — TYPHA IP LLC (57) ABSTRACT

An image display device includes a first substrate formed of a resin material; a second substrate located to face the first substrate, the second substrate being formed of a resin material having a different property from that of the first substrate; an electro-optical layer between the first substrate and the second substrate; a plurality of pixel electrodes located between the electro-optical layer and the first substrate; a plurality of switching elements electrically connected with the plurality of pixel electrodes respectively; and a color filter included in a layer between the first substrate and the plurality of switching elements.

19 Claims, 8 Drawing Sheets

(56) References Cited

U.S. PATENT DOCUMENTS

2015/0362812 A1* 12/2015 Aoki .................... G02B 6/0011
                                                          362/611
2017/0269421 A1*  9/2017 Oka .................. G02F 1/133305

FOREIGN PATENT DOCUMENTS

| JP | 2007-065270 A | 3/2007 |
| JP | 2012-98715 A | 5/2012 |
| JP | 2013-145390 A | 7/2013 |

* cited by examiner

IMAGE DISPLAY DEVICE

CROSS REFERENCE TO RELATED APPLICATIONS

This application is based upon and claims the benefit of priority from the prior Japanese Patent Application No. 2016-053988, filed on Mar. 17, 2016, the entire contents of which are incorporated herein by reference.

FIELD

The present invention relates to an image display device including an electro-optical layer, and specifically to an image display device including a liquid crystal layer as the electro-optical layer.

BACKGROUND

Conventionally, a liquid crystal display (LCD) including a liquid crystal cell that includes a liquid crystal layer held between a pair of substrates is known. Such a liquid crystal display, which has features of being lightweight, thin and the like, is used as a display of a mobile information terminal such as a mobile phone, a tablet device or the like. Especially recently, the liquid crystal display is reduced in cost and thus is used in a wider range of fields including a wrist watch, an electric home appliance and the like, in addition to the mobile information terminal.

A main stream liquid crystal display is an active matrix type liquid crystal display including a switching element provided between one of a pair of substrates and a liquid crystal layer and performing on/off control on each of pixels by use of the switching element. This type of liquid crystal display allows light, introduced from a light source such as a backlight unit or the like, to be selectively transmitted by the on/off control on each pixel and provides an image by the transmitted light.

Especially a liquid crystal display capable of providing a color image has a structure in which light selectively transmitted through each pixel is divided into, for example, three primary colors of RGB by a color filter provided on an optical path and a desired color image is displayed by a combination of the three primary colors. A known example of the liquid crystal display is described in Japanese Laid-Open Patent Publication No. 2003-195288.

SUMMARY

An image display device in an embodiment according to the present invention includes a first substrate formed of a resin material; a second substrate located to face the first substrate, the second substrate being formed of a resin material having a different property from that of the first substrate; an electro-optical layer between the first substrate and the second substrate; a plurality of pixel electrodes located between the electro-optical layer and the first substrate; a plurality of switching elements electrically connected with the plurality of pixel electrodes respectively; and a color filter included in a layer between the first substrate and the plurality of switching elements.

DESCRIPTION OF EMBODIMENTS

The liquid crystal display described in Japanese Laid-Open Patent Publication No. 2003-195288 includes a pair of substrates, a liquid crystal layer, a TFT (thin film transistor) provided between one of the pair of substrates and the liquid crystal layer, and a color filter provided between the TFT and a pixel electrode. Such a structure increases the thickness of a region between the pixel electrode and the TFT, which requires a large contact hole to be formed in order to electrically connect the TFT and the pixel electrode to each other. As a result, the numerical aperture of the pixel may be undesirably decreased.

In the case of the liquid crystal display described in Japanese Laid-Open Patent Publication No. 2003-195288, there is no blocking member between a viewer of a screen thereof and the thin film transistor. Therefore, unnecessary light reflected by a metal line such as a signal line or the like included in the thin film transistor may undesirably decrease the visual recognizability.

One object of the present invention is to provide an image display device having high visual recognizability.

One object of the present invention is to provide an image display device easy to produce.

Hereinafter, embodiments of the present invention will be described with reference to the drawings. The present invention may be carried out in various forms without departing from the gist thereof, and is not to be construed as being limited to any of the following embodiments. In the drawings, components may be shown schematically regarding the width, thickness, shape and the like, instead of being shown in accordance with the actual sizes, for the sake of clearer illustration. The schematic drawings are merely exemplary and do not limit the interpretations of the present invention in any way. In the specification and the drawings, components that have substantially the same functions as those described before with reference to a previous drawing(s) bear the identical reference signs thereto, and detailed descriptions thereof may be omitted.

In this specification, the terms "up", "down", "outer", "inner" and the like used with respect to the drawings each represent a positional relationship between a component that is a target of attention and another component. For example, in this specification, as seen in a side view, a direction from a liquid crystal layer toward a color filter is defined as "upward", and an opposite direction is defined as "downward". As seen in a plan view, a direction from the center of a display region toward an end of a substrate is defined as "outward", and an opposite direction is defined as "inward".

In this specification, in the case where the expression that "α includes A, B or C", "α includes any one of A, B and C", "α includes one selected from the group consisting of A, B and C" or the like is provided, such an expression does not exclude a case where α includes any combination of A through C unless otherwise specified. Such an expression does not exclude, either, a case where α includes any other element.

In this specification, an "image display device" refers to a device displaying an image by use of an electro-optical layer. Therefore, the image display device encompasses a display module (also referred to as a "display panel") including an electro-optical layer and also a display device including a combination of the display module and any other element (e.g., backlight unit, cover member, polarization member, etc.).

In each of the following embodiments, the "electro-optical layer" may encompass a liquid crystal layer, an electroluminescence (EL) layer, an electrochromic (EC) layer, and an electrophoretic layer unless any technological contradiction occurs. In each of the following embodiments, an image display device including a liquid crystal module that includes a liquid crystal layer will be described. However, the present invention is also applicable to an image display device including a display module including any of the above-described electro-optical layers.

Embodiment 1

Figure 1:
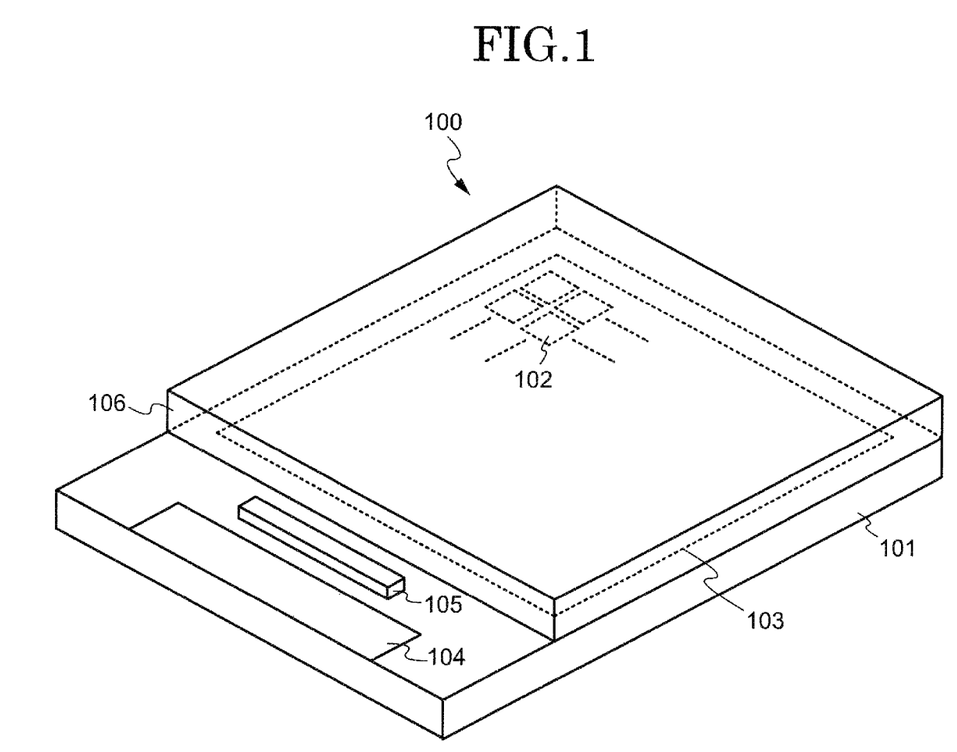
FIG. 1 shows a schematic structure of a liquid crystal module in embodiment 1.

First, a schematic structure of a liquid crystal module 100 included in an image display device 1 in embodiment 1 will be described. FIG. 1 shows a schematic structure of the liquid crystal module 100 in embodiment 1.

The liquid crystal module 100 includes an array substrate 101, a display region 103 formed in the array substrate 101 and including a plurality of pixels 102, a terminal region 104 supplying an external signal to the display region 103, a driving integrated circuit 105 located between the display region 103 and the terminal region 104, and a counter substrate 106 located to face the array substrate 101. As described below, the image display device 1 may include a polarization member (e.g., polarization film) adjacent to each of the array substrate 101 and the counter substrate 106.

The array substrate 101 has the plurality of pixels 102 provided therein, and the plurality of pixels 102 each include a switching element such as a thin film transistor or the like. The array substrate 101 is also referred to as an "active matrix substrate". The pixels 102 are located in a matrix and form the display region 103 as a whole. Each of the pixels 102 includes a circuit using a thin film transistor acting as the switching element. The switching element is on/off-controlled to control the alignment of liquid crystal molecules in correspondence with each pixel 102.

FIG. 1 shows the driving integrated circuit 105 provided in order to drive the thin film transistors included in the display region 103. A gate driver circuit or a source driver circuit each including a thin film transistor may be provided around the display region 103. In this case, the gate driver circuit or the source drive circuit is driven by a driving signal received from the driving integrated circuit 105. The driving integrated circuit 105 may be an external IC chip or the like.

A liquid crystal layer 107 (see FIG. 2) is held between the array substrate 101 and the counter substrate 106. An assembly of the array substrate 101, the counter substrate 106 and the liquid crystal layer 107 may be referred to as a "liquid crystal cell". The counter substrate 106 is bonded to the array substrate 101 by use of, for example, a sealing member containing a resin material.

Figure 2:
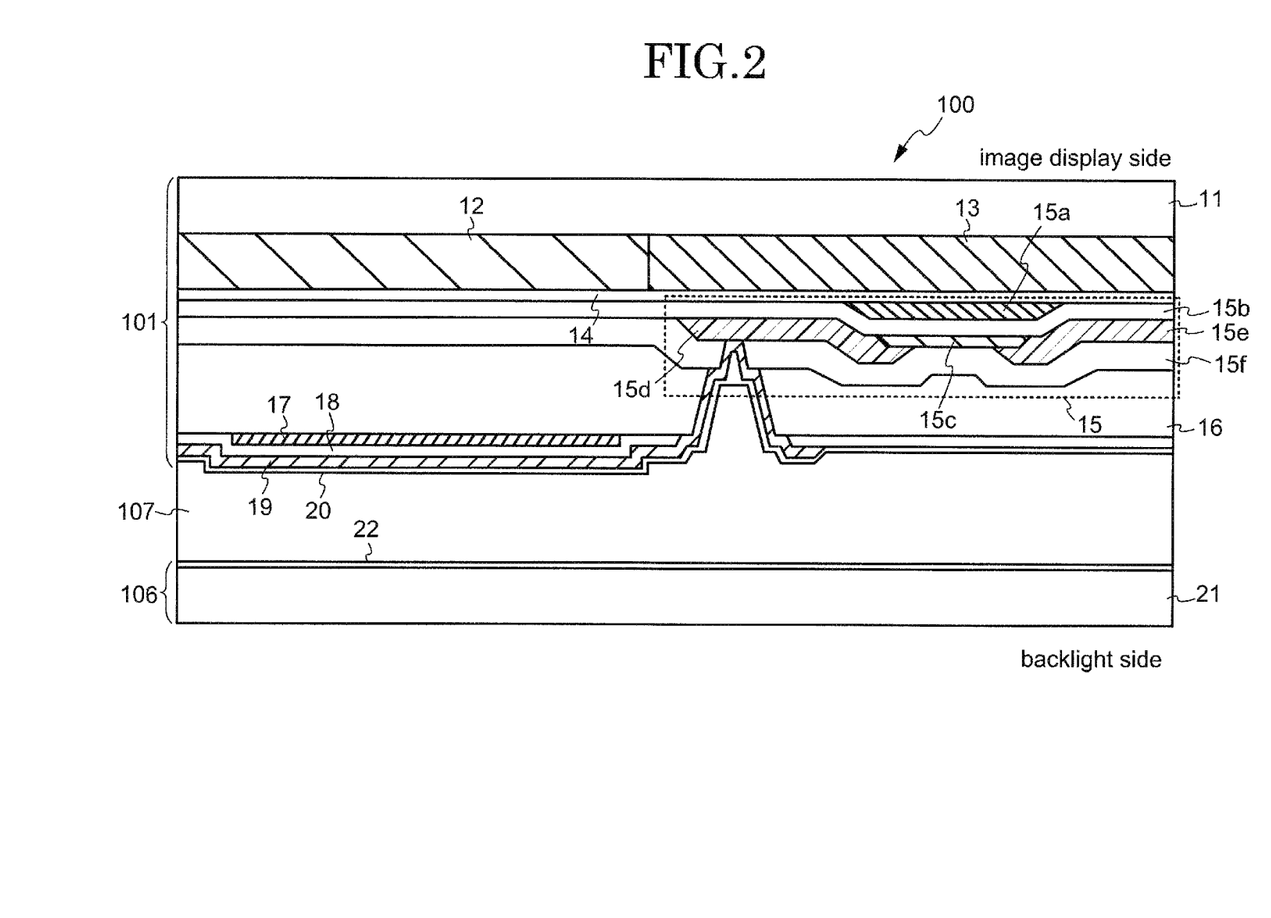
FIG. 2 shows a cross-sectional structure of a pixel included in the liquid crystal module in embodiment 1.

FIG. 2 shows a cross-sectional structure of a pixel included in the liquid crystal module 100 in embodiment 1.

The liquid crystal module 100 in this embodiment has a structure in which the liquid crystal layer 107 is held between the array substrate 101 and the counter substrate 106. The liquid crystal module 100 in this embodiment performs image display on the side of the array substrate 101 with respect to the liquid crystal layer 107. Therefore, unlike in a general liquid crystal module including a backlight unit provided on the side of the array substrate, a backlight unit is provided on the side of the counter substrate 106.

In this embodiment, the array substrate 101 includes a glass substrate 11, a color filter 12, a light blocking layer 13, an underlying layer 14, a TFT (thin film transistor) 15, a flattening layer 16, a common electrode 17, an insulating layer 18, a pixel electrode 19, and an alignment film 20. The array substrate 101 may include any other element in addition to the above-described elements, needless to say.

The glass substrate 11 may be replaced with a substrate formed of any other light-transmissive material, for example, a resin substrate. In this specification, the term "resin substrate" refers to a flat plate-like member formed of a resin material. The "resin substrate" encompasses, for example, a molded sheet-like member formed of a resin material (resin sheet) and a film-like member formed of a resin material (resin film).

The color filter 12 is located in a light-transmissive region (region where light from a backlight unit is transmitted) of each pixel. The color filter 12 may be formed of, for example, a resin material containing a pigment. In accordance with the type of pigment, light of a part of a spectrum corresponding to each of colors such as R (red), G (green), B (blue) and W (white) is transmitted through the color filter 12.

The light blocking layer 13 may be formed of, for example, a resin material containing a black pigment or carbon. As shown in FIG. 2, in this embodiment, the light blocking layer 13 is provided between the glass substrate 11 and the TFT 15, so that the TFT 15 is not directly visually recognizable by a viewer of an image on the image display device 1. The light blocking layer 13 is also referred to as a "black matrix".

The light blocking layer 13 is a member provided for the purpose of blocking light, and therefore, may be a light-blocking metal film. However, in the case where the metal film is used as the light blocking layer 13, capacitance coupling caused between the TFT 15 and the metal film may influence the operation of the image display device 1. Therefore, in the structure of this embodiment, it is preferable that the light blocking layer 13 is formed of a resin material containing a black pigment.

In this embodiment, the color filter 12 and the light blocking layer 13 are both formed of a resin material. The resin material usable for the color filter 12 and the light blocking layer 13 is, for example, an acrylic resin, polyamide or the like. It is especially preferable to use an acrylic resin in consideration of the processing temperature and the retardation of the production process of the TFT 15 described below.

The underlying layer 14 is an insulating layer containing silicon such as silicon oxide, silicon nitride or the like. In this example, the underlying layer 14 is provided for the purpose of separating the color filter 12 and the light blocking layer 13 formed of a resin material from the TFT 15. The underlying layer 14 may be referred to as an "overcoat" layer.

The TFT 15 acts as a switching element controlling the pixel 102 to be in an on state or an off state. In this embodiment, the TFT 15 is a so-called bottom gate-type TFT. Specifically, the TFT 15 in this embodiment includes a gate electrode 15a, a gate insulating layer 15b, an active layer 15c, terminal electrodes 15d and 15e, and a protective layer 15f.

In this embodiment, the active layer 15c of the TFT 15 is formed of an oxide semiconductor. The oxide semiconductor usable for the active layer 15c is, for example, a transparent amorphous oxide semiconductor (TAOS). The TAOS usable for the TFT 15 is, specifically, an oxide containing at least one of indium, gallium and zinc; for example, indium gallium zinc oxide (IGZO), indium gallium oxide (IGO), indium zinc oxide (IZO), zinc tin oxide (Zn-SnO), zinc oxide (ZnO) or the like.

In this embodiment, after the color filter 12 and the light blocking layer 13 are formed of a resin material, the TFT 15 is formed. Therefore, the heat resistance of the color filter 12 and the light blocking layer 13 needs to be considered. The oxide semiconductor may be formed into a film at a very low temperature of about 25° C. to about 100° C. Therefore, the TFT 15 may be formed even after the color filter 12 and the light blocking layer 13 are formed of a resin material.

The active layer 15c may be formed of any semiconductor material that can be formed into a film at a temperature lower than, or equal to, the temperature at which the resin material is resistive; for example, may be formed of amorphous silicon.

The terminal electrodes 15d and 15e act as terminals that input a voltage to, or output a voltage from, the TFT 15, and are usually referred to as a source electrode and a drain electrode. In this embodiment, the terminal electrodes 15d and 15e are formed of silicon containing n-type or p-type impurities. The functions of the terminal electrodes 15d and 15e are switched to each other in accordance with the direction in which the carriers move. Therefore, the terminal electrodes 15d and 15e may act as a source electrode or a drain electrode.

The protective layer 15f is an insulating layer formed of silicon oxide, and has a role of protecting the TFT 15 against the flattening layer 16 formed of a resin material. Namely, the protective layer 15f has a function of preventing the flattening layer 16 from contacting the active layer 15c.

The flattening layer 16 is formed of a resin material and has a function of flattening convexed and concaved portions caused by the TFT 15. In this embodiment, the flattening layer 16 is formed of an acrylic resin as the resin material, but may be formed of another resin material such as polyimide, polyamide or the like.

The common electrode 17 is formed of a transparent conductive film. The common electrode 17 is provided in order to form a lateral electric field (also referred to as a "fringe field") between the common electrode 17 and the pixel electrode 19 adjacent thereto. The transparent conductive film usable for the common electrode 17 is formed of an inorganic compound such as ITO (indium tin oxide), ZnO (zinc oxide) or the like.

The insulating layer 18 is formed of silicon nitride, and is provided so as to cover the common electrode 17 and the flattening layer 16. The insulating layer 18 electrically insulates the common electrode 17 and the pixel electrode 19 from each other, and also acts as an insulating element for a storage capacitance formed by the common electrode 17 and the pixel electrode 19.

The pixel electrode 19 is formed of a transparent conductive film, and as described above, forms a lateral electric field between the pixel electrode 19 and the common electrode 17. The transparent conductive film usable for the pixel electrode 19 is formed of an inorganic compound such as ITO (indium tin oxide), ZnO (zinc oxide) or the like. The pixel electrode 19 is electrically connected with the TFT 15 via a contact hole formed in the flattening layer 16.

The above-described structure allows the potential of the pixel electrode 19 to be controlled via the TFT 15, and thus a desired voltage is allowed to be applied between the common electrode 17 and the pixel electrode 19. In this manner, a predetermined electric field is formed between the common electrode 17 and the pixel electrode 19, and the electric field controls the alignment of the liquid crystal molecules in the liquid crystal layer 107. The alignment film 20 may be a known alignment film or may be omitted.

The liquid crystal module 100 in this embodiment includes the counter substrate 106 provided to face the array substrate 101 having the above-described structure. In this embodiment, the counter substrate 106 includes a glass substrate 21 and an alignment film 22. The glass substrate 21 may be replaced with a substrate formed of a light-transmissive material, like the glass substrate 11. The alignment film 22 may be a known alignment film or may be omitted.

As described above, in the liquid crystal module 100 in this embodiment, the array substrate 101 includes the color filter 12, the light blocking layer 13, the TFT 15 and the pixel electrode 19. Therefore, the counter substrate 106 in this embodiment does not include any element other than the glass substrate 21 and the alignment film 22. Namely, the counter substrate 106 includes, other than the glass substrate 21, only a so-called flat, uniform film (i.e., a non-patterned film, or a film having a uniform thickness in at least a region overlapping the display region). The counter substrate 106 in the liquid crystal module 100 in this embodiment does not include any element that needs to be aligned in terms of the position (e.g., color filter or light blocking layer). Therefore, it is not necessary to perform a precise positional alignment for bonding the array substrate 101 and the counter substrate 106 to each other, which simplifies the production process of the liquid crystal module 100.

The alignment film 22 in the counter substrate 106 is a flat layer. Therefore, the liquid crystal molecules may be aligned by rubbing alignment as well as by optical alignment on the side of the counter substrate 106. By contrast, on the side of the array substrate 101 including the alignment 20 having concaved and convexed portions, it is preferable to align the liquid crystal molecules by optical alignment.

In this embodiment, the counter substrate 106 includes only the glass substrate 21 and the alignment film 22. Alternatively, the counter substrate 106 may include any other element. For example, a further layer such as an overcoat layer or the like may be provided between the glass substrate 21 and the alignment film 22. However, it is desirable that a stack of the further layer such as an overcoat layer or the like and the alignment film 22 is flat in at least a region overlapping the display region 103 in order to make the above-described positional alignment unnecessary. Namely, it is desirable that a flat layer overlapping the pixel electrode 19 as seen in a plan view is provided on a surface of the glass substrate 21 facing the liquid crystal layer 107. With such a structure, it is not necessary to perform the precise positional alignment for bonding the array substrate 101 and the counter substrate 106 to each other.

As shown in FIG. 2, in this embodiment, the side of the glass substrate 11 opposite to the side facing the liquid crystal layer 107 is the image display side (i.e., the viewer side) (i.e., the side of the glass substrate 11 opposite to the side on which the color filter 12 and the light blocking layer 13 are provided is the image display side). Therefore, the light blocking layer 13 is provided between the glass substrate 11 and the TFT 15, and thus unnecessary light reflected by a metal line (e.g., gate electrode 15a) included in the TFT 15 is prevented from entering the eye of the viewer located at the image display side. Conventionally, a light blocking layer is included in a counter substrate. In this embodiment, the light blocking layer does not need to be included in the counter substrate 106.

The liquid crystal module 100 in this embodiment includes a great number of pixel electrodes 19 in at least the display region 103. Therefore, an inconvenience that external electrostatic charges adversely influence the liquid crystal layer 107 is suppressed. In the liquid crystal module 100 of the lateral electric field type, the common electrode 17 is provided over at least the entirety of the display region 103. Therefore, the external electrostatic charges are further suppressed from adversely influencing the liquid crystal layer 107. Namely, an inconvenience that when an electric field is applied to the liquid crystal layer 107, the external electrostatic charges disturb the electric field and thus disturb the alignment of the liquid crystal molecules is suppressed.

Figure 3:
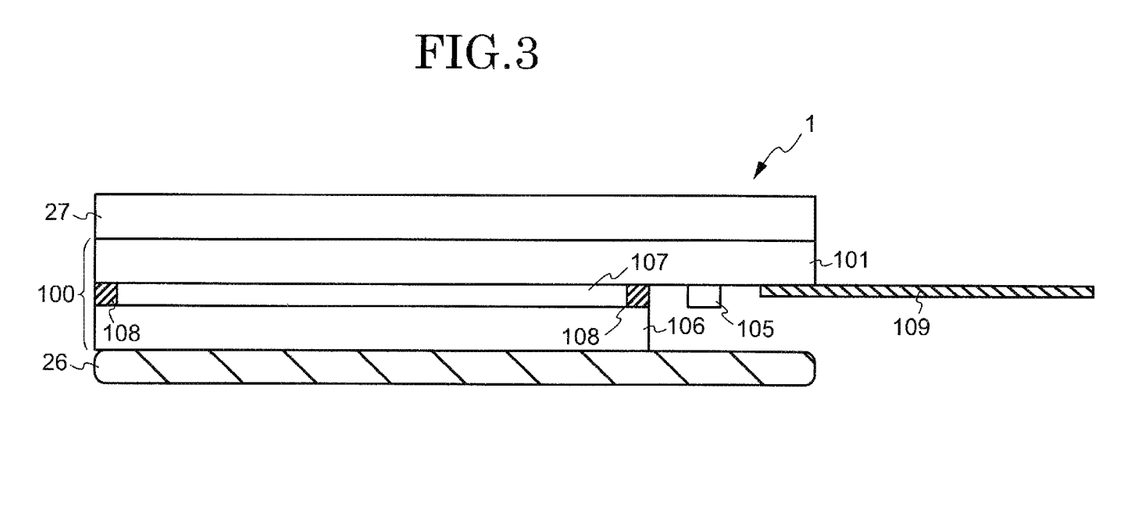
FIG. 3 shows a schematic structure of an image display device in embodiment 1.

Now, with reference to FIG. 3, the image display device 1 including the liquid crystal module 100 will be described. FIG. 3 shows a schematic structure of the image display device 1 in embodiment 1.

The liquid crystal module 100 has a structure in which the array substrate 101 and the counter substrate 106 described above with reference to FIG. 2 are bonded together with a sealing member 108, and the liquid crystal layer 107 is held in a space enclosed by the sealing member 108. To an end of a surface of the array substrate 101 facing the liquid crystal layer 107 (specifically, to the terminal region 104 shown in FIG. 1), a flexible printed circuit (FPC) 109 transmitting a signal to, and receiving a signal from, an external circuit is connected. As shown in FIG. 3, the image display device 1 in this embodiment includes a backlight unit 26 on the side of the counter substrate 106 of the liquid crystal module 100, and also includes a cover member 27 on the side of the array substrate 101. Although not shown, a polarization member (e.g., polarization film) is provided between the counter substrate 106 and the backlight unit 26, and also between the array substrate 101 and the cover member 27.

The backlight unit 26 is provided on a side of the counter substrate 106 (specifically, the glass substrate 21 shown in FIG. 2) opposite to the side facing the liquid crystal layer 107 (i.e., the backlight unit 26 is provided on the "backlight side" in FIG. 2). Therefore, light emitted from the backlight unit 26 is transmitted through the counter substrate 106, the polarization member (not shown), the liquid crystal layer 107 and the array substrate 101 in this order.

The cover member 27 is provided on a side of the array substrate 101 (specifically, the glass substrate 11 shown in FIG. 2) opposite to the side facing the liquid crystal layer 107 (i.e., the cover member 27 is provided on the "image display side" in FIG. 2). Therefore, the viewer visually recognizes, via the cover member 27, an image displayed by the liquid crystal module 100.

The cover member 27 may be formed of a glass material or a plastic material. It is desirable to use a cover member formed of a glass material (also referred to as a "cover glass") in order to protect the liquid crystal module 100.

As described above, unlike in the conventional structure, the image display device 1 in this embodiment includes the backlight unit 26 on the side of the counter substrate 106 of the liquid crystal module 100, not on the side of the array substrate 101.

In this embodiment, the cover member 27 is provided for the purpose of protecting the liquid crystal module 100. Therefore, the cover member 27 is provided on the side of the array substrate 101, unlike in the conventional structure. In the case where a touch panel is mounted, the cover member 27 may be used as a member for forming an electrode of a sensor for the touch panel.

Embodiment 2

Figure 4:
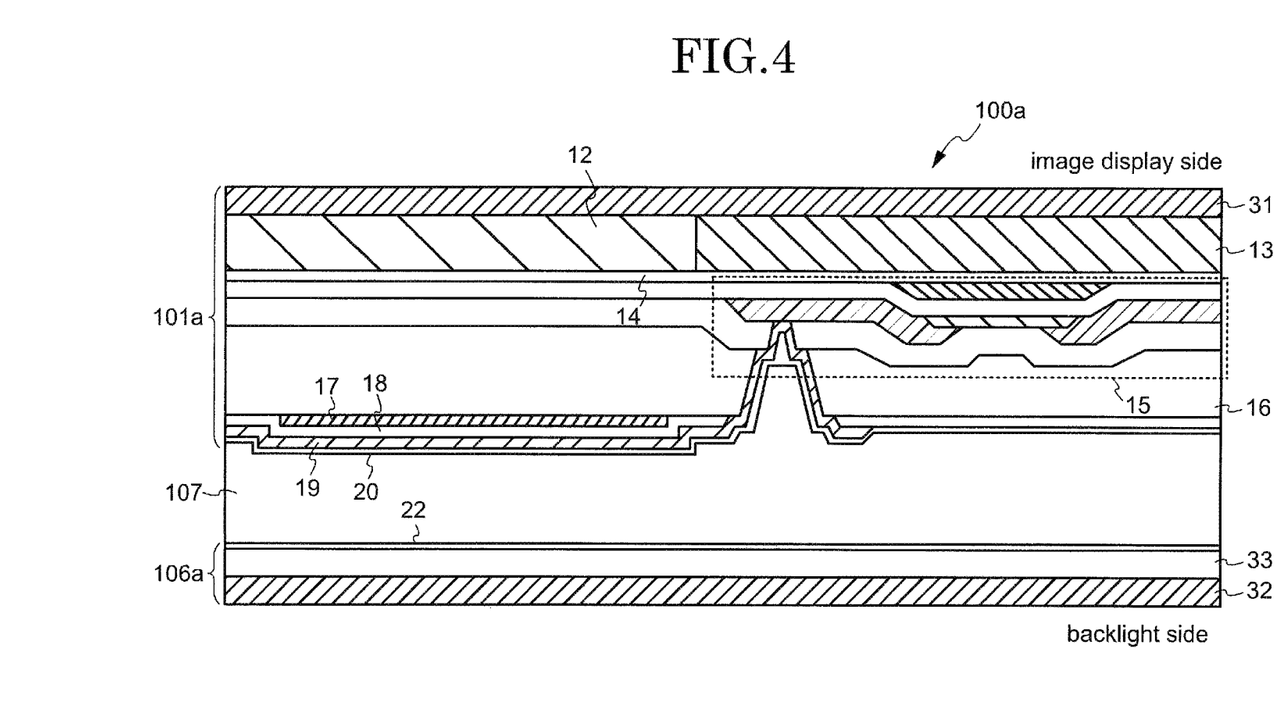
FIG. 4 shows a cross-sectional structure of a pixel included in a liquid crystal module in embodiment 2.

With reference to FIG. 4, a liquid crystal module 100a in embodiment 2 will be described. Unlike the liquid crystal module 100 in embodiment 1, the liquid crystal module 100a in embodiment 2 includes resin substrates 31 and 32 as support substrates instead of the glass substrates 11 and 21. In this embodiment, the differences from embodiment 1 will be mainly described, and elements same as those of the liquid crystal module 100 in embodiment 1 bear the same reference signs thereto and descriptions thereof may be omitted. In this embodiment, the color filter 12 may be provided in a counter substrate 106a.

FIG. 4 shows a cross-sectional structure of a pixel included in the liquid crystal module 100a in embodiment 2. The liquid crystal module 100a shown in FIG. 4 includes the resin substrate 31 as the support substrate for an array substrate 101a and includes an assembly of the resin substrate 32 and a resin film 33 as the support substrate for the counter substrate 106a. In this embodiment, the resin substrates 31 and 32 are polyimide substrates.

The liquid crystal module 100a in this embodiment includes a great number of pixel electrodes 19 in at least a region overlapping the display region 103, and therefore, suppresses an inconvenience that the external electrostatic charges adversely influence the liquid crystal layer 107. In the liquid crystal module 100a of the lateral electric field type, the common electrode 17 is provided over the entirety of the display region 103. Therefore, the external electrostatic charges are further suppressed from adversely influencing the liquid crystal layer 107. Namely, an inconvenience that when an electric field is applied to the liquid crystal layer 107, the external electrostatic charges disturb the electric field and thus disturb the alignment of the liquid crystal molecules is suppressed.

In order to protect a liquid crystal layer against external electrostatic charges, a technology of providing a transparent conductive film between the liquid crystal module and a cover member (as shown in FIG. 3) is in wide use for liquid crystal displays. In this embodiment, however, the support substrate of the array substrate 101a is the resin substrate 31. Therefore, in the case where, for example, a transparent conductive film is formed by a method such as sputtering, photolithography or the like, the resin material may be deteriorated by the load applied at the time of the formation of the transparent conductive film. In this embodiment, as described above, the array substrate 101a including the pixel electrode 19 and the common electrode 17 is located on the image display side, and these electrodes protect the liquid crystal layer 107 against the electrostatic charges. In other words, it is not necessary to provide a transparent conductive film on the image display side of the array substrate 101a.

In the case where the resin substrates 31 and 32 are polyimide substrates, it is desirable that the resin substrates 31 and 32 are as thin as possible because a large retardation is caused to the polyimide substrates. However, the polyimide substrates become weaker as becoming thinner. Therefore, it is preferable to provide some reinforcement to the resin substrates 31 and 32.

In this embodiment, the counter substrate 106a includes the resin film 33 as a reinforcing member provided between the resin substrate 32 and the liquid crystal layer 107. Thus, the retardation of the resin substrate 32 formed of polyimide is alleviated while the counter substrate 106a is reinforced by the resin film 33. In this case, the resin film 33 is formed of a resin material other than polyimide. Examples of the resin material usable for the resin film 33 include polyethylene, polypropylene, acrylic resin, methacrylic resin, epoxy, urethane, polyaramide, polystyrene, polyarylate and the like. Among these materials, polyaramide, polystyrene and polyarylate are preferable.

In the liquid crystal module 100a in this embodiment, the color filter 12 and the light blocking layer 103 formed of a resin material are located in contact with the resin substrate 31. The color filter 12 and the light blocking layer 103 act as reinforcing members that reinforce the array substrate 101a. Therefore, the array substrate 101a does not need to include any member corresponding to the resin film 33, unlike the counter substrate 106a. This allows the support substrate for the array substrate 101a to be thinner than the support substrate for the counter substrate 106a. In this case also, it is preferable that the color filter 12 and the light blocking layer 103 are formed of a resin material other than polyimide.

In this embodiment, the resin substrates 31 and 32 are formed of polyimide. The material of the resin substrates 31 and 32 is not limited to polyimide. For example, the resin substrates 31 and 32 may be formed of PET or a fiber-reinforced plastic (FRP) material, instead of polyimide.

Use of the resin substrates as the support substrates as described above allows the thickness of each of the array substrate 101a and the counter substrate 106a to be suppressed to 30 μm or less (typically, 5 to 20 μm). In this embodiment, the resin substrates 31 and 32 used as the support substrates are very thin, and therefore, the array substrate 101a and the counter substrate 106a may be treated as being flexible.

Embodiment 3

Figure 5:
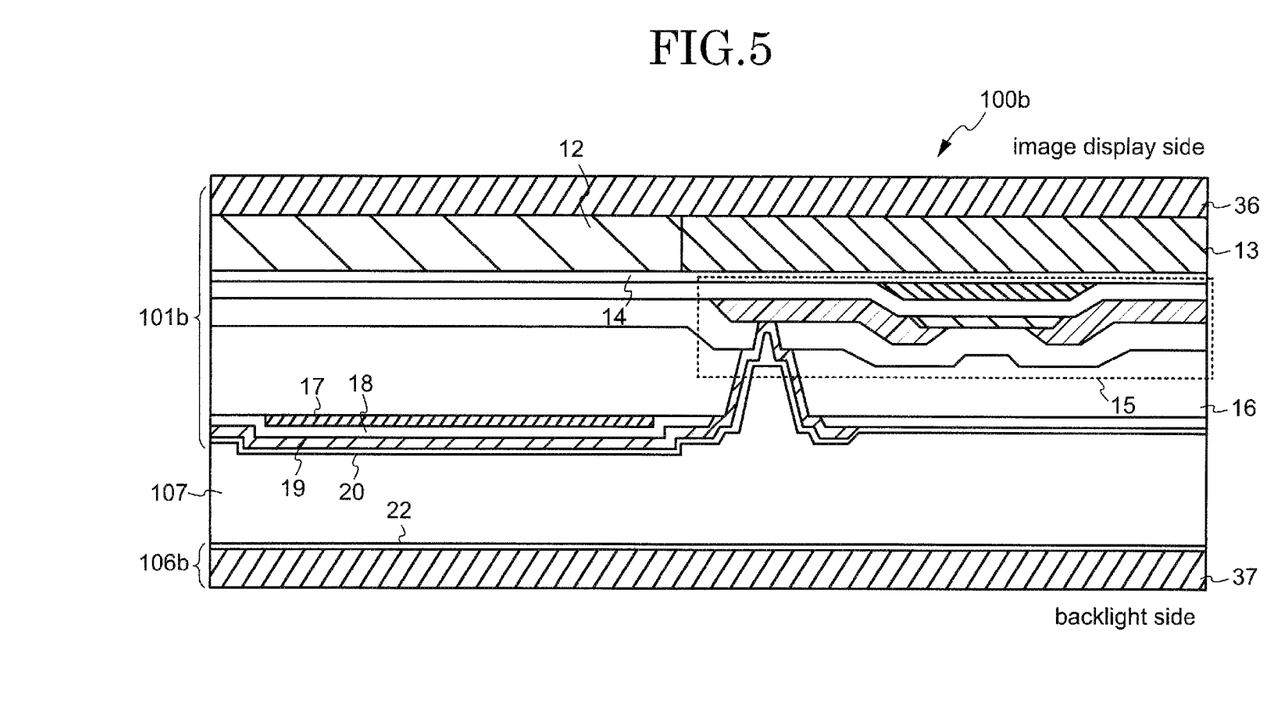
FIG. 5 shows a cross-sectional structure of a pixel included in a liquid crystal module in embodiment 3.

With reference to FIG. 5, a liquid crystal module 100b in embodiment 3 will be described. Unlike the liquid crystal module 100 in embodiment 1, the liquid crystal module 100b in embodiment 3 includes resin substrates 36 and 37 having different properties from each other as the support substrates on the side of an array substrate 101b and on the side of a counter substrate 106b, instead of the glass substrates 11 and 21. In this embodiment, the differences from embodiment 1 will be mainly described, and elements same as those of the liquid crystal module 100 in embodiment 1 bear the same reference signs thereto and descriptions thereof may be omitted. In this embodiment, the array substrate 101b is provided on the image display side. Alternatively, the counter substrate 101b may be provided on the image display side.

FIG. 5 shows a schematic structure of a pixel included in the liquid crystal module 100b in embodiment 3. The liquid crystal module 100b in this embodiment may include the resin substrate 36 formed of polyimide as the support substrate included in the array substrate 101b. The liquid crystal module 100b may include the resin substrate 37 formed of, for example, polystyrene as the support substrate included in the counter substrate 106b. Namely, the support substrates in the array substrate 101b and the counter substrate 106b may be formed of different resin materials from each other.

Herein, the term "properties" refer to physical properties of a substance. Specifically, in this embodiment, the glass transition temperature (Tg), the coefficient of linear thermal expansion (CTE), the UV transmittance, the thickness-direction retardation (Tth) and the in-plane retardation (Ro) will be mainly described. Any other physical property may be considered, or one or more of the above-listed physical properties may not be considered.

Like in embodiment 1, in the liquid crystal module 100b in this embodiment, the array substrate 101b includes the color filter 12, the light blocking layer 13, the TFT 15 and the pixel electrode 19. Therefore, the counter substrate 106b does not include any element other than the glass substrate 21 and the alignment film 22. This simplifies the production process of the counter substrate 106b. Therefore, in the liquid crystal module 100b in this embodiment, the material of the resin substrate 37 may be selected with a higher degree of freedom than the material of the resin substrate 36 in the array substrate 101b. This allows the resin substrate 37 in the counter substrate 106b to have different properties from those of the resin substrate 36 in the array substrate 101b.

In general, a support substrate used in an array substrate needs to have such a glass transition temperature as to withstand the heat treatment in the production process of the TFT and the like. The support substrate also needs to have performances of, for example, being highly transmissive and being resistive against thermal expansion or shrinkage. However, high transmissiveness (low retardation) and resistivity against thermal expansion or shrinkage (low coefficient of linear thermal expansion) are in a trade-off relationship, and it is difficult to provide both thereof. In the case where the production process includes a step of ultraviolet light irradiation through a counter substrate (for example, in the case where the sealing member is irradiated with ultraviolet light directed through the counter substrate to be cured), it is preferable that the support substrate included in the counter substrate is formed of a material that absorbs ultraviolet light at a minimum possible level. In consideration of these factors, it is highly advantageous that the material of a resin substrate in the counter substrate may be selected with a high degree of freedom.

In this embodiment, the array substrate 101b and the counter substrate 106a respectively include the resin substrate 36 and the resin substrate 37 having different properties from each other by making use of the above-described advantage. More specifically, this advantage allows the resin material 37 in the counter substrate 106b to be formed of a material having a lower glass transition temperature than, or a higher coefficient of linear thermal expansion than, the material of the resin substrate 36 in the array substrate 101b. Even these factors only allow the material of the resin substrate 37 to be selected from a wider variety of materials.

Table 1 shows the glass transition temperature, the coefficient of linear thermal expansion and the UV transmittance, as examples of properties, of the representative resin materials. In table 1, the UV transmittance is the transmittance for light having a wavelength of 365 nm.

TABLE 1

|  | GLASS TRANSITION TEMPERATURE (Tg) [° C.] | COEFFICIENT OF LINEAR THERMAL EXPANSION [ppm/K] | UV TRANSMITTANCE @365 nm [%] |
| --- | --- | --- | --- |
| LOW THERMAL EXPANSION POLYIMIDE | >350 | 20 | <10 |
| TRANSPARENT POLYIMIDE | >350 | 50 | <10 |
| PAR (POLYARYLATE) | >300 | 60 | <10 |
| PS (BIAXIALLY ORIENTED POLYSTYRENE) | 220 | — | >60 |
| AROMATIC PA (AROMATIC POLYAMIDE, ARAMIDE) | >300 | 5 | — |
| FIBER-REINFORCED PLASTIC | >250 | 10 | >70 |
| PEN (POLY(ETHYLENE NAPHTHALATE)) | >250 | 30 | <10 |
| PET (POLY(ETHYLENE TEREPHTHALATE) | 100 | 20 | >70 |
| PC (POLYCARBONATE) | 155 | 70 | — |

Table 1 shows that among the resin materials used in the liquid crystal module 100b in this embodiment, polystyrene used for the resin substrate 37 has a lower glass transition temperature than that of polyimide used for the resin substrate 36 but has a higher light transmittance for ultraviolet light having a wavelength of 365 nm than that of polyimide. Thus, the light transmittance for ultraviolet light of the resin substrate 37 is higher than that of the resin substrate 36, which is advantageous in the case where the production process includes the step of ultraviolet light irradiation through the resin substrate 37 for, for example, curing the sealing member.

It is preferable that the thickness-direction retardation, which significantly influences the transmittance of the substrate, is as low as possible. Therefore, it is desirable that the material of the resin substrate 37 has a lower thickness-direction retardation than that of the material of the resin substrate 36. In the case where the resin substrate 37 is formed of a material having a low thickness-direction retardation, the liquid crystal display may be reduced in size because, for example, a retardation compensation member (e.g., retardation compensation film) may be omitted. Since a material having a low thickness-direction retardation is usable, the resin substrate 37 may be made thicker than the resin substrate 36, which reinforces the counter substrate 106b.

As described above, in this embodiment, a resin material suitable for the required performance may be used by making use of the high degree of freedom for the material selection for the resin substrate 37. For example, the resin substrate 36 may be formed of polyimide whereas the resin substrate 37 may be formed of one of polyaramide, polystyrene and polyarylate. In the case where, for example, polyaramide is used, the resin substrate 37 has a low coefficient of linear thermal expansion. In the case where polyarylate is used, the resin substrate 37 has a low retardation (namely, has a high transmittance). The resin substrates 36 and 37 in the liquid crystal module 100b in this embodiment may be formed of other materials than the resin materials shown in Table 1.

Even in the case where the resin substrate 36 and the resin substrate 37 are formed of the same resin material (e.g., polyimide), the resin substrate 37 in the counter substrate 106b may be formed of a type of polyimide having a lower thickness-direction retardation than, or a higher ultraviolet light transmittance than, the polyimide used for the resin substrate 36. In this case, the type of polyimide having a lower thickness-direction retardation than the polyimide used for the resin substrate 36 often has a higher coefficient of linear thermal expansion than the polyimide used for the resin substrate 36, although the counter substrate 106b merely includes an alignment film and the like and often does not need to be formed in consideration of the influence of heat. In this embodiment, different types of the same resin material that have different properties may be optionally used for different resin substrates.

The resin materials shown in Table 1 other than polyimide are basically available in the form of a sheet member. Such a sheet member may be used for the resin substrate 37 in the counter substrate 106b in the liquid crystal module 100b in this embodiment.

In general, a resin substrate is formed as follows. A resin film of polyimide or the like is formed on a support plate, and the support plate is peeled off from the resin film, so that the left resin film acts as the resin substrate. Therefore, a glass plate is needed as the support plate, and the step of peeling off the glass plate from the resin film is needed. By contrast, in this embodiment, the material of the resin substrate 37 may be selected with a high degree of freedom. This allows a resin sheet of polyaramide, polystyrene, polyarylate or the like to be used as the counter substrate. The support plate or the step of peeling off is not needed. The resin sheet is already molded and is not much thermally expanded or shrunk. Thus, use of a resin sheet allows the material of the resin substrate 37 to be selected from a wide range of materials in consideration of the thickness and the properties.

In this case, the resin substrate 37 may be formed of a material containing an alignment functional group that aligns the liquid crystal molecules, so that the alignment film may be omitted and the liquid crystal molecules in the liquid crystal layer 107 may be aligned by the resin substrate 37. This is made possible by use of the technology described in, for example, Japanese Laid-Open Patent Publication No. 2013-145390 or Japanese Laid-Open Patent Publication No. 2012-98715.

Embodiment 4

Figure 6:
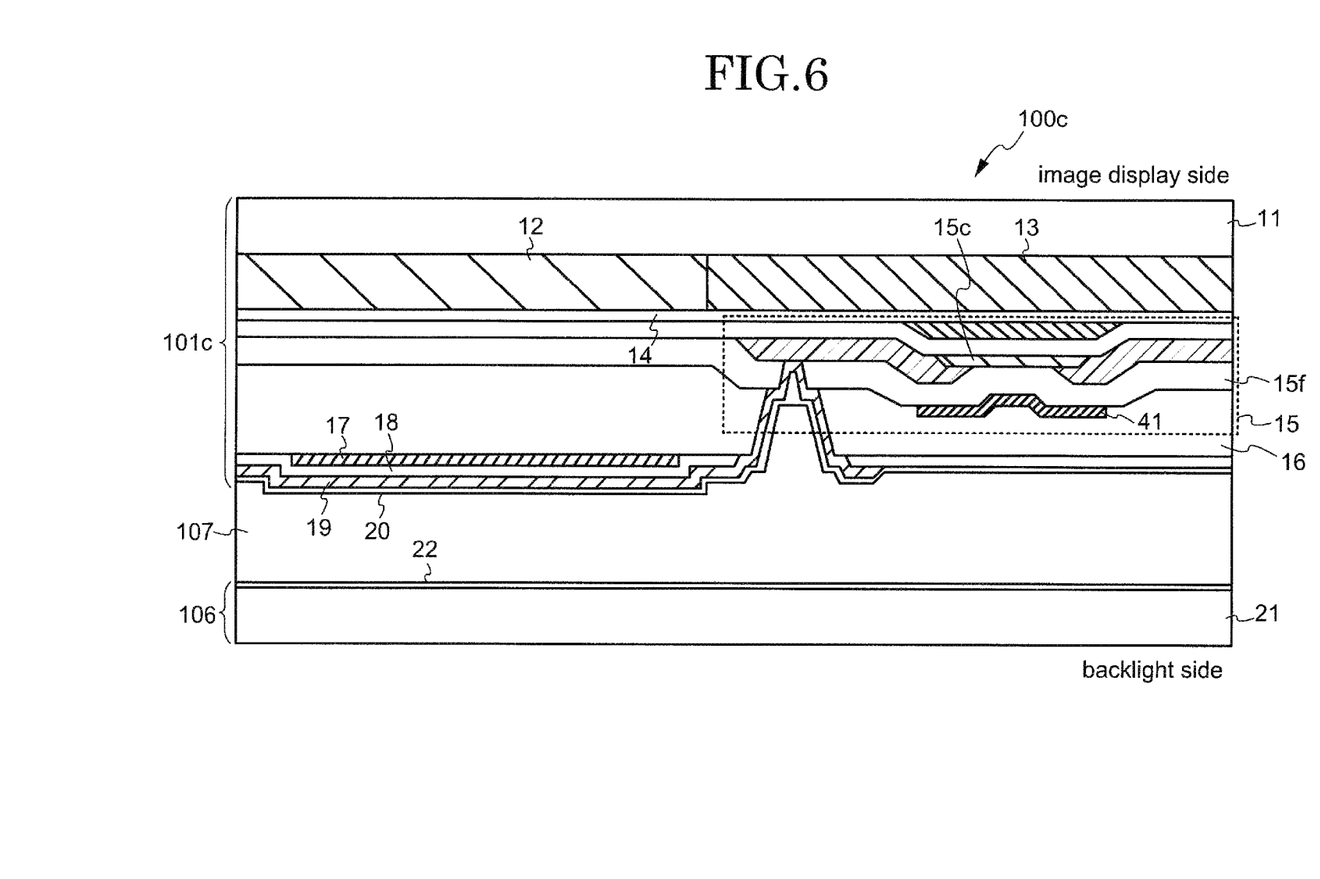
FIG. 6 shows a cross-sectional structure of a pixel included in a liquid crystal module in embodiment 4.

With reference to FIG. 6, a liquid crystal module 100c in embodiment 4 will be described. Unlike the liquid crystal module 100 in embodiment 1, the liquid crystal module 100c in embodiment 4 further includes a light blocking layer 41 provided between the TFT 15 and the backlight unit 26 (FIG. 3). In this embodiment, the differences from embodiment 1 will be mainly described, and elements same as those of the liquid crystal module 100 in embodiment 1 bear the same reference signs thereto and descriptions thereof may be omitted.

FIG. 6 shows a cross-sectional structure of a pixel included in the liquid crystal module 100c in embodiment 4. The liquid crystal module 100c in this embodiment includes, in addition to the light blocking layer 13, the light blocking layer 41 provided between the TFT 15 and the liquid crystal layer 107 (specifically, between the protective layer 15f and the flattening layer 16). As seen in a plan view, the light blocking layer 41 is located at a position overlapping the active layer 15c. The light blocking layer 41 may be formed of a metal material or may be formed of a resin material containing a black pigment or carbon.

In the liquid crystal module 100c in this embodiment, light emitted from the backlight unit 26 (see FIG. 3) is blocked by the light blocking layer 41 and thus does not reach the active layer 15c. Therefore, a leak current is prevented from being generated by light excitation in the active layer 15c.

In this embodiment, the light blocking layer 41 is provided between the protective layer 15f and the flattening layer 16. The light blocking layer 41 is not limited to being provided at this position. The light blocking layer 41 merely needs to be provided between the TFT 15 and the backlight unit 26. For example, the light blocking layer 41 may be provided in a part of the counter substrate 106 although not shown. However, It is preferable that the light blocking layer 41 is provided in a part of an array substrate 101c because as the distance between the light blocking layer 41 and the active layer 15c is shorter, the light is blocked more effectively.

Embodiment 5

Figure 7:
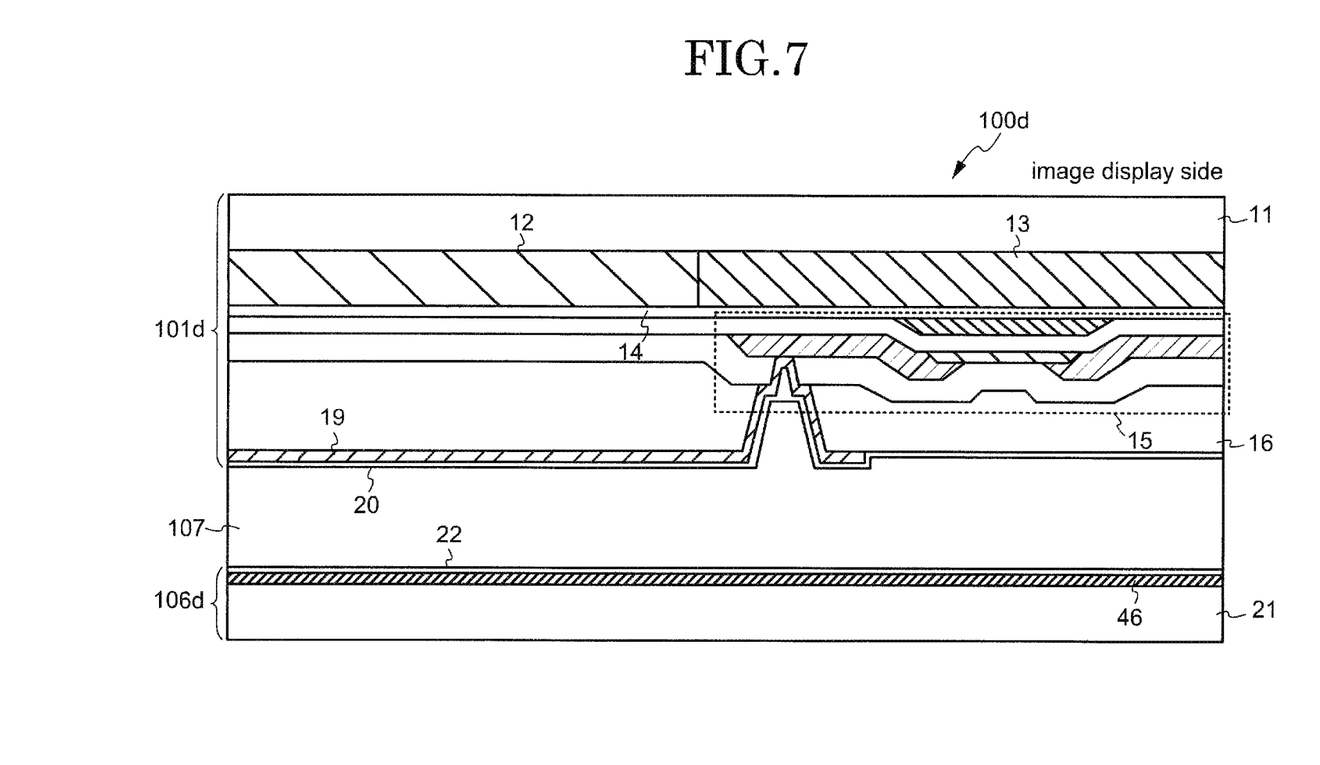
FIG. 7 shows a cross-sectional structure of a pixel included in a liquid crystal module in embodiment 5.

With reference to FIG. 7, a liquid crystal module 100d in embodiment 5 will be described. Unlike the liquid crystal module 100 in embodiment 1, the liquid crystal module 100d in embodiment 5 includes a reflective layer 46 provided over a plurality of pixels in a counter substrate 106d, so that the liquid crystal module 100d is of a reflection type. In this embodiment, the differences from embodiment 1 will be mainly described, and elements same as those of the liquid crystal module 100 in embodiment 1 bear the same reference signs thereto and descriptions thereof may be omitted.

FIG. 7 shows a cross-sectional structure of a pixel included in the liquid crystal module 100d in embodiment 5. The liquid crystal module 100d in this embodiment includes the reflective layer 46 provided in a part of the counter substrate 106d, more specifically, between the glass substrate 21 and the liquid crystal layer 107. The reflective layer 46 is provided in order to reflect external light incident thereon from the image display side, and may be formed of a metal material. The metal material usable for the reflective layer 46 is, for example, aluminum or silver having a high reflectance.

In the liquid crystal module 100d in this embodiment, a common potential is applied to the reflective layer 46 to form a vertical electric field between the pixel electrode 19 and the reflective layer 46. The vertical electric field controls the alignment of the liquid crystal molecules in the liquid crystal layer 107. Therefore, an array substrate 101d in this embodiment may not need to include the common electrode 17 or the insulating layer 18 described in embodiment 1. In embodiment 5, a line transmitting the common potential to the array substrate 101d may be provided, and the line and the reflective layer 46 may be electrically connected with each other outside the display region 103.

In this embodiment, the control mode on the liquid crystal layer 107 is a VA mode. The control mode is not limited to the VA mode, and may be a TN mode or an ECB mode. Alternatively, the control mode may be an IPS mode or an FFS mode, which is a lateral field mode, in the case where the array substrate 101d includes the common electrode 17. In this case, it is not necessary to apply the common potential to the reflective layer 46.

In the liquid crystal module 100d in this embodiment, the reflective layer 46 is provided in a part of the counter substrate 106d (as seen in a plan view, in at least a region overlapping the display region 103). Therefore, external light incident from the image display side is reflected upward in a wide range. In a conventional reflective type liquid crystal module, each of pixel electrodes acts as a reflective layer. Therefore, the area size of reflection is small. By contrast, in this embodiment, the external light is reflected by the reflective layer 46 having an area size corresponding to at least the entirety of the display region 103. Therefore, the liquid crystal module 100d has an improved reflection efficiency.

Embodiment 6

Figure 8:
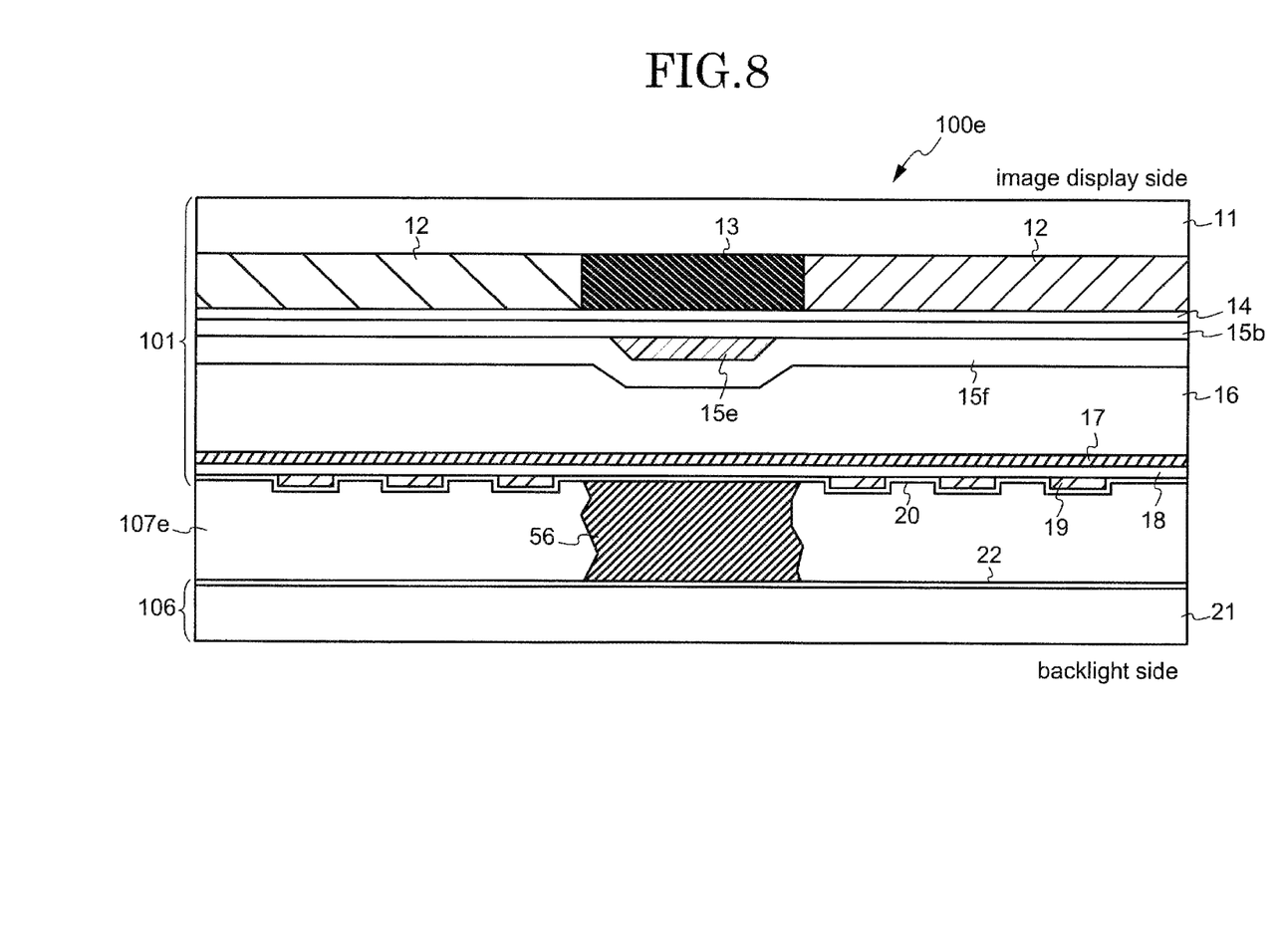
FIG. 8 shows a cross-sectional structure of pixels included in a liquid crystal module in embodiment 8.

With reference to FIG. 8, a liquid crystal module 100e in embodiment 6 will be described. Unlike the liquid crystal module 100 in embodiment 1, the liquid crystal module 100e in embodiment 6 includes a polymer-containing resin structural body 56 in a liquid crystal layer 107e. In this embodiment, the differences from embodiment 1 will be mainly described, and elements same as those of the liquid crystal module 100 in embodiment 1 bear the same reference signs thereto and descriptions thereof may be omitted.

FIG. 8 shows a cross-sectional structure of pixels included in the liquid crystal module 100e in embodiment 6. The liquid crystal module 100e in this embodiment includes the resin structural body 56 provided in the liquid crystal layer 107e. Specifically, as seen in a plan view, the resin structural body 56 is provided in a region that is between pixels adjacent to each other (specifically, between pixel electrodes adjacent to each other) and overlaps the light blocking layer 13.

The resin structural body 56 is a structural body obtained as a result of polymerization of a monomer (i.e., is a polymer), and is also referred to as a "polymer wall". A preferable monomer usable for the resin structural body 56 is a monomer having a high solubility in a liquid crystal material and thus having a molecular framework similar to that of the liquid crystal molecules such as, for example, a phenyl group, a cyclohexane group or the like. Specific examples of the material usable for the resin structural body 56 include polyethylene, polypropylene, polyolefin, acrylic resin, methacrylic resin, epoxy, urethane, polystyrene, poly(vinyl alcohol), fluorine-based resin, and a copolymer thereof.

A method for forming the resin structural body 56 may be the following method described in, for example, Japanese Laid-Open Patent Publication No. 2007-65270. A monomer is dispersed in advance in the liquid crystal layer 107e. The liquid crystal layer 107e is irradiated with ultraviolet light (typically, light having a central wavelength of 365 nm) directed, through the counter substrate 106, between the pixels to locally polymerize the monomer. Thus, the resin structural body 56 is formed. In this case, the resin structural body 56 may be considered as a polymer of the monomer dispersed in advance in the liquid crystal layer 107e. Alternatively, the resin structural body 56 may be considered as a three-dimensional crosslinked body of such a polymer.

The resin structural body 56 formed as a result of polymerization of the monomer dispersed in the liquid crystal layer 107e has a feature of being bonded to both of the array substrate 101 and the counter substrate 106. A column-like resinous spacer generally used widely is integrated with a flattening layer formed of an organic material. Such a spacer is usable to adjust the interval in the thickness direction of the liquid crystal module, but is not usable to suppress the offset in a direction parallel to the surfaces of the array substrate and the counter substrate. In the case where such a spacer is used, the alignment film may be shaved as a result of the offset in the direction parallel to the surfaces of the substrates, which may decline the quality. By contrast, the resin structural body 56 in this embodiment is bonded to both of the pair of substrate 101 and 106, and thus overcomes the above-described disadvantage of the column-like spacer.

The resin structural body 56 is formed by polymerization of the monomer dispersed in the liquid crystal layer 107e. As a result, after the optical energy is provided (namely, after the resin structural body 56 is formed), the monomer not used to form the resin structural body 56 may remain in the liquid crystal layer 107e.

As described above, the resin structural body 56 may be located in a desired region, specifically, in a region in the liquid crystal layer 107e that is between the pixels adjacent to each other (specifically, between the pixel electrodes adjacent to each other) and overlaps the light blocking layer 13 as seen in a plan view by use of this embodiment and the technology described in Japanese Laid-Open Patent Publication No. 2007-65270.

The structure of the liquid crystal module 100e in this embodiment is preferable to form the resin structural body 56 by use of the polymer formation technology described in Japanese Laid-Open Patent Publication No. 2007-65270. For forming the resin structural body 56, the liquid crystal layer 107e is irradiated with ultraviolet light directed through the counter substrate 106 using a metal mask having an opening in a region corresponding to a region between the pixels. Thus, the monomer, which is of an ultraviolet-curable type, in the liquid crystal layer 107e is polymerized to form the resin structural body 56. A liquid crystal module of a conventional structure includes a light blocking layer in a counter substrate so as to block light directed toward a region between the pixels as seen in a plan view. Therefore, the ultraviolet light, which is directed through the counter substrate, is blocked by the light blocking layer and thus does not efficiently irradiate a region of the liquid crystal layer between the pixels.

By contrast, the liquid crystal module 100e in this embodiment does not need to include a light blocking layer in the counter substrate 106. Therefore, the ultraviolet light is merely directed through the counter substrate 106 by use of a metal mask, so that a region of the liquid crystal layer 107e between the pixels is irradiated with the ultraviolet light efficiently to form the resin structural body 56. The resin structural body 56 may be formed at any position in accordance with the position of the opening in the metal mask, as well as in the region between the pixels.

The technology described in embodiment 3 may be used to form, as the support substrate included in the counter substrate 106, a resin substrate of a resin material having a high UV transmittance such as polystyrene or the like. In this case, the efficiency of ultraviolet light irradiation is further improved, which increases the production yield.

The devices described above in embodiments according to the present invention may have an element added thereto, or deleted therefrom, or may be changed in design optionally by a person of ordinary skill in the art. The methods described above in embodiments according to the present invention may have a step added thereto, or deleted therefrom, or may be changed in a condition optionally by a person of ordinary skill in the art. Such devices and methods are encompassed in the scope of the present invention as long as including the gist of the present invention.

Even functions and effects that are different from those provided by the above-described embodiments but are obvious from the description of this specification or are easily expectable by a person of ordinary skill in the art are naturally construed as being provided by the present invention.

What is claimed is:

1. An image display device, comprising:
   a first substrate formed of a resin material;
   a second substrate located to face the first substrate, the second substrate being formed of a resin material having a different property from that of the first substrate;
   an electro-optical layer between the first substrate and the second substrate;
   a plurality of pixel electrodes located between the electro-optical layer and the first substrate;
   a plurality of switching elements electrically connected with the plurality of pixel electrodes respectively; and
   a color filter included in a layer between the first substrate and the plurality of switching elements.

2. The image display device according to claim 1, wherein a side of the first substrate opposite to a side thereof facing the electro-optical layer is an image display side.

3. The image display device according to claim 2, wherein:
   the electro-optical layer is a liquid crystal layer; and
   a surface of the second substrate facing the liquid crystal layer contains an alignment functional group aligning liquid crystal molecules in the liquid crystal layer.

4. The image display device according to claim 2, wherein the second substrate has a lower thickness-direction retardation than that of the first substrate.

5. The image display device according to claim 2, wherein the second substrate has a lower glass transition temperature than that of the first substrate.

6. The image display device according to claim 2, wherein the second substrate has a higher transmittance for light having a wavelength of 365 nm than that of the first substrate.

7. The image display device according to claim 2, wherein the second substrate has a higher coefficient of linear thermal expansion than that of the first substrate.

8. The image display device according to claim 2, wherein:
the first substrate is formed of polyimide; and
the second substrate is formed of polyaramide, polystyrene or polyarylate.

9. The image display device according to claim 1, wherein:
the electro-optical layer is a liquid crystal layer; and
a surface of the second substrate facing the liquid crystal layer contains an alignment functional group aligning liquid crystal molecules in the liquid crystal layer.

10. The image display device according to claim 1, wherein the second substrate has a lower thickness-direction retardation than that of the first substrate.

11. The image display device according to claim 1, wherein the second substrate has a lower glass transition temperature than that of the first substrate.

12. The image display device according to claim 1, wherein the second substrate has a higher transmittance for light having a wavelength of 365 nm than that of the first substrate.

13. The image display device according to claim 1, wherein the second substrate has a higher coefficient of linear thermal expansion than that of the first substrate.

14. The image display device according to claim 1, wherein:
the first substrate is formed of polyimide; and
the second substrate is formed of polyaramide, polystyrene or polyarylate.

15. The image display device according to claim 1, wherein the first substrate and the second substrate are formed of different types of polyimide having different properties from each other.

16. The image display device according to claim 1, wherein the second substrate is a resin sheet.

17. The image display device according to claim 1, wherein the first substrate is thinner than the second substrate.

18. The image display device according to claim 1, wherein the switching elements are each a transistor including an oxide semiconductor.

19. The image display device according to claim 1, wherein the first substrate and the second substrate are flexible.

* * * * *